United States Patent Office 3,272,883
Patented Sept. 13, 1966

3,272,883
SYNTHESIS OF 3-PHENYLINDENE
Lawrence J. Hughes, Hitchcock, Tex., assignor to Monsanto Company, a corporation of Delaware
No Drawing. Filed Dec. 27, 1963, Ser. No. 334,030
10 Claims. (Cl. 260—668)

The present invention relates to a novel method for the preparation of 3-phenylindene.

One of the oldest types of synthetic resins is that generally designated as the coumarone-indene resins. Commercial development of these materials has progressed steadily over the years since their introduction at the turn of the century. Numerous modifications of these thermoplastic resins of relatively low molecular weight have been proposed employing various indene derivatives in their production. However, the synthesis of many of the indene derivatives has not always been feasible on a commercial scale. 3-phenylindene, for example, has heretofore been available only by means of a somewhat complicated multi-step synthesis. Typical of one of the more recent of the wide variety of methods used for preparing this compound is that which involves, for example, a Grignard reaction between phenyl magnesium bromide and 1-indanone followed by dehydration of the resulting 1-hydroxy-1-phenylindane. The 1-indanone is prepared by addition of hydrogen chloride to indene followed by oxidation of the resulting 1-chloroindane. Overall yields in such a process have been in the range from 35 to 55%. It has now been discovered, however, that 3-phenylindene can be prepared from readily available starting materials by a one-step process in yields equivalent to, or better than, the multi-step syntheses known to the art.

According to the present invention, 3-phenylindene is prepared by reacting benzene with either a 1,3-dihalopropene or a precursor thereof, a trihalopropane, in the presence of a Friedel-Crafts-type catalyst and recovering the product from the reaction mixture by conventional techniques. The preferred halopropenes or halopropanes are those in which the halogen is chlorine and/or bromine such as 1,3-dichloropropene, 1,3-dibromopropene, 1,2,3-trichloropropane, 1,3,3-tribromopropane, 1,2,3-tribromopropane, 1,3,3-trichloropropane, 1-chloro-3-bromopropene, and the like.

Molecular proportions of benzene and the particular halogenated hydrocarbon anywhere from about 1:1 to about 10:1 can be employed. Preferably, the benzene/halohydrocarbon reactant ratios are maintained in the range from about 5:1 to about 6:1.

The reaction takes place in the presence of an active Friedel-Crafts catalyst. Aluminum chloride is a particularly useful Friedel-Crafts catalyst but other Friedel-Crafts catalysts such as aluminum bromide, zirconium chloride, boron fluoride, titanium chloride, stannic chloride, and the like may be used. Amounts of catalyst varying from about 0.01 to about 0.5 mole per mole of halohydrocarbon reactant can be employed. Preferably, the amount of catalyst used lies in the range from about 0.15 to about 0.4 mole per mole of halohydrocarbon reactant.

The reaction is carried out generally at temperatures in the range from about 0° to about 50° C. with the particular temperature depending upon the reactants and the catalyst used. Preferably, the reaction temperature is maintained from about 20° C. to about 40° C. It is preferred, of course, to conduct the reaction at atmospheric pressure but this does not preclude either the use of superatmospheric or subatmospheric pressures since either can be employed if desired.

After the reaction has been completed, the reaction mixture is processed to remove the catalyst and the reaction product is worked up to recover the 3-phenylindene by conventional means. For example, the reaction mixture after completion of the reaction may be contacted with ice, water, or other suitable media for hydrolyzing the Friedel-Crafts catalyst. Water or ice is particularly advantageous since an aqueous layer of the hydrolyzed catalyst can then be separated from the hydrocarbon layer. The hydrocarbon layer is washed several times with water and dried. Unreacted benzene is then stripped from this layer by distillation and can be recycled to the reaction. The remaining material is distilled under vacuum to concentrate the 3-phenylindene in a fraction generally boiling between 110 and 160° C. at 1 mm. of Hg absolute. The crude fraction can then be purified if desired by refractionation, collecting a fraction boiling between 124 and 127° C. at 1 mm. of Hg absolute.

Operation of the process may be either on a batch or a continuous basis.

The invention is illustrated in the following examples which, however, are not to be considered as limiting it in any manner whatsoever.

*Example 1*

A mixture of 26.6 g. (0.2 mole) of aluminum chloride and 234 g. (3.0 moles) of benzene was charged to an alkylation flask. To this there was added gradually over a period of about 1.5 hours, 73.8 g. (0.5 mole) of 1,2,3-trichloropropane while the mixture was being continuously stirred and the temperature in the flask was maintained in the range from about 23° C. to about 40° C. The reaction mixture was then stirred for another 0.5 hour at a temperature of about 40° C.

At the end of the reaction period, the reaction mixture was poured onto 500 g. of ice containing 100 cc. of concentrated hydrochloric acid to hydrolyze the catalyst. The organic layer was separated from the resulting mixture, washed with two 100-ml. portions of water, and dried over anhydrous sodium sulfate. After stripping off of the unreacted benzene, the residue was subjected to distillation under reduced pressure. About 14.8 g. of a cut boiling from about 106 to 124° C. at 1 mm. was obtained which consisted principally of 3-phenylindene. Its identity was established by means of a comparison of the infrared and mass spectrometric analyses of the fraction with those of a known sample of 3-phenylindene. A molecular weight determination also verified the identity of the product which was obtained in a yield of 32.5% based on a conversion of trichloropropane of 36.9%.

*Example 2*

1,3-dichloropropene (22.2 g. or 0.5 mole) was added gradually with continuous stirring to an alkylation flask containing 234 g. (3.0 moles) of benzene having suspended therein 26.6 g. (0.2 mole) of aluminum chloride. During the 1.75-hour period of addition of the dichloropropene reactant, the reaction temperature was maintained in the range from about 24° to about 40° C. At the end of this time, the reaction mixture was poured into 100 cc. of HCl mixed with 500 cc. of ice. The organic layer separated from the resulting mixture was washed with water, dried over anhydrous sodium sulfate, and distilled to remove the unreacted benzene. Thereafter, the residue was subjected to distillation at reduced pressure to yield about 20.1 g. of distillate in two fractions boiling in the range from 111 to about 173° C. at 1 mm. Hg absolute and consisting substantially of 3-phenylindene as indicated by infrared and mass spectrometric analyses.

*Example 3*

Following essentially the same procedure as described in Examples 1 and 2 above, 234.3 g. (3.0 moles) of benzene was reacted with 112.0 g. (1.0 mole) of 1,3-dichloropropene in the presence of 39.9 g. (0.3 mole) of aluminum chloride. About 1.25 hours were required for introduction of the dichloropropene into the suspension of aluminum chloride and benzene and the temperature during this addition period was maintained from about 29° to about 40° C. The mixture was stirred for an additional 0.5 hour at about 40° C., after which it was worked up substantially as described in the foregoing examples. Material balance calculations showed that a conversion of dichloropropene of 71% was obtained and that the yield of 3-phenylindene was 23.3% based on this conversion. If the 3-phenyl-1-chloropropene also produced is recycled to the reaction, the ultimate yield of 3-phenylindene attained would be between 45–50%.

What is claimed is:

1. A method for the production of 3-phenylindene which comprises reacting benzene with a halohydrocarbon chosen from the group consisting of 1,3-dihalopropenes, 1,2,3-trihalopropanes, and 1,3,3-trihalopropanes in the presence of a Friedel-Crafts catalyst and recovering 3-phenylindene from the resulting reaction mixture.

2. The process of claim 1 wherein the reaction is conducted at temperatures within the range from 0° C. to about 50° C.

3. The process of claim 2 wherein the molecular proportions of benzene to halohydrocarbon are in the range from about 1:1 to about 10:1.

4. The process of claim 3 wherein the amount of said Friedel-Crafts catalyst is in the range from about 0.01 to about 0.5 mole per mole of halohydrocarbon.

5. A method for the production of 3-phenylindene which comprises reacting benzene and a 1,3-dihalopropene in molecular proportions such that the ratio of benzene to said dihalopropene is in the range from about 1:1 to about 10:1 at a temperature from about 0° C. to about 50° C. in the presence of from about 0.01 to about 0.5 mole of aluminum chloride per mole of said dihalopropene.

6. The process of claim 5 wherein said dihalopropene is 1,3-dichloropropene.

7. The process of claim 6 wherein the molecular ratio of benzene to 1,3-dichloropropene is about 6:1, the temperature is maintained within the range from about 20° C. to about 40° C., and the amount of aluminum chloride is from about 0.15 to about 0.4 mole per mole of dichloropropene.

8. A method for the production of 3-phenylindene which comprises reacting benzene and a 1,2,3-trihalopropane in molecular proportions such that the ratio of benzene to said trihalopropane is in the range from about 1:1 to about 10:1 at a temperature from about 0° C. to about 50° C. in the presence of from about 0.01 to about 0.5 mole of aluminum chloride per mole of said trihalopropane.

9. The process of claim 8 wherein said trihalopropane is 1,2,3-trichloropropane.

10. The process of claim 9 wherein the molecular ratio of benzene to 1,2,3-trichloropropane is about 6:1, the temperature is maintained within the range from about 20° C. to about 40° C., and the amount of aluminum chloride is from about 0.15 to about 0.4 mole per mole of trichloropropane.

References Cited by the Examiner
UNITED STATES PATENTS 2,815,382   12/1957   Carpenter et al. ____ 260—590

DELBERT E. GANTZ, *Primary Examiner.*

C. R. DAVIS, *Assistant Examiner.*